United States Patent
Urim et al.

(10) Patent No.: US 10,303,526 B2
(45) Date of Patent: May 28, 2019

(54) DEVICE SPECIFIC HANDLING OF USER INTERFACE COMPONENTS

(75) Inventors: Alexander Urim, San Francisco, CA (US); Lee Williams Byron, San Francisco, CA (US); Wayne Jin Chang, Seattle, WA (US); Phillip Fung, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 494 days.

(21) Appl. No.: 13/043,382

(22) Filed: Mar. 8, 2011

(65) Prior Publication Data

US 2012/0233239 A1 Sep. 13, 2012

(51) Int. Cl.
G06F 15/16 (2006.01)
G06F 9/54 (2006.01)
G06F 3/14 (2006.01)

(52) U.S. Cl.
CPC ............ G06F 9/542 (2013.01); G06F 3/1454 (2013.01); *G06F 2209/544* (2013.01); *G09G 2370/022* (2013.01)

(58) Field of Classification Search
CPC .................................................. H04L 63/0281
USPC ......................................................... 709/203
See application file for complete search history.

(56) References Cited

U.S. PATENT DOCUMENTS

| | | | |
|---|---|---|---|
| 7,509,374 B2 * | 3/2009 | Trinh et al. | 709/203 |
| 2004/0163046 A1 | 8/2004 | Chu | |
| 2006/0063518 A1 | 3/2006 | Paddon | |
| 2007/0222865 A1 * | 9/2007 | Levien | H04N 5/765 348/222.1 |
| 2008/0282172 A1 | 11/2008 | Bayang | |
| 2008/0320390 A1 * | 12/2008 | Semple | G06F 3/0227 715/700 |
| 2009/0241135 A1 | 9/2009 | Wong | |
| 2009/0249359 A1 * | 10/2009 | Caunter | G06F 9/4448 719/315 |
| 2009/0298478 A1 * | 12/2009 | Tyhurst | H04W 4/50 455/414.1 |
| 2010/0082634 A1 * | 4/2010 | Leban | G06F 17/30991 707/741 |
| 2011/0022733 A1 * | 1/2011 | Karaoguz | H04L 67/303 709/247 |
| 2012/0029939 A1 * | 2/2012 | Danielson | G06F 19/322 705/3 |
| 2013/0035835 A1 * | 2/2013 | Hachtel | B60T 8/3265 701/70 |

OTHER PUBLICATIONS

International Search Report and Written Opinion for International Application No. PCT/US2012/028278, dated Sep. 27, 2012.

* cited by examiner

Primary Examiner — Normin Abedin
Assistant Examiner — Karina J Garcia-Ching
(74) Attorney, Agent, or Firm — Baker Botts L.L.P.

(57) ABSTRACT

One embodiment receives a request for a screen of a user interface (UI) of a software application from a second computing device, wherein the screen comprises one or more UI components; accesses a set of features of the second computing device; for each UI component contained in the screen, generates first code for rendering and displaying the UI component on the second computing device based on the set of features of the second computing device; and transmits the first code to the second computing device.

14 Claims, 8 Drawing Sheets

FIGURE 6 ary, the description is intended to cover
DEVICE SPECIFIC HANDLING OF USER INTERFACE COMPONENTS

TECHNICAL FIELD

This disclosure generally relates to device-specific handling of a software application's user interface and more specifically relates to handling various aspects of the individual components included in an application user interface, such as their behavior, visual appearance, and existence in the user interface, based on the types of devices on which the application user interface resides and executes.

BACKGROUND

A software application often includes a user interface (UI) that enables its users to interact with the application. For example, a user may provide inputs to the application and the outputs of the application may be presented to the user through the application user interface. With modern software applications, the user interfaces are often graphical in nature. A graphical user interface (GUI) is a special type of user interface that allows software users to interact with a software application with images rather than text commands. Both native software applications and web-based software applications may include graphical user interfaces.

SUMMARY

This disclosure generally relates to device specific handling of a software application's user interface and more specifically relates to handling various aspects of the individual components included in an application user interface, such as their behavior, visual appearance, and existence in the user interface, based on the types of devices on which the application user interface resides and executes.

Particular embodiments receive a request for a screen of a user interface (UI) of a software application from a second computing device, wherein the screen comprises one or more UI components; access a set of features of the second computing device; for each UI component contained in the screen, generate first code for rendering and displaying the UI component on the second computing device based on the set of features of the second computing device; and transmit the first code to the second computing device.

These and other features, aspects, and advantages of the disclosure are described in more detail below in the detailed description and in conjunction with the following figures.

DESCRIPTION OF EXAMPLE EMBODIMENTS

This disclosure is now described in detail with reference to a few embodiments thereof as illustrated in the accompanying drawings. In the following description, numerous specific details are set forth in order to provide a thorough understanding of this disclosure. However, This disclosure may be practiced without some or all of these specific details. In other instances, well known process steps and/or structures have not been described in detail in order not to unnecessarily obscure This disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A software application, whether native or web-based, often includes a graphical user interface (GUI) through which its users may interact with it (e.g., providing inputs to or receiving outputs from the application). Typically, the GUI of an application may be constructed with any number of user interface (UI) components of various types arranged in a hierarchy. For example, an application GUI may include a number of screens or web pages, and the user may transit from one screen or web page to another screen or web page depending on the programming logic of the application. Within each screen or web page, there may be a number of frames or panels. Within each frame or panel, there may be a number of buttons, text fields, check boxes, menus, clickable links, icons, and so on. Screen, frame, panel, button, text field, check box, clickable link, icon, menu, and menu item are several examples of the different types of UI components that may be used to construct a GUI. In the context of the present disclosure, a UI component, or simply component, refers to any suitable type of component that may be included in a GUI. Some types of UI components may further include other components and some do not. For example, a frame or a panel may further include a number of buttons, list boxes, radio buttons, icons, etc.; and a menu may further include a number of menu items. In contrast, a button, a clickable link, an icon, or a block of text typically does not include another component. For clarification purposes, in the context of the present disclosure, a UI component that can include one or more other UI components is referred to as a complex UI component. In contrast, a UI component that does not include any other UI component is referred to as a basic UI component. Of course, whether a specific type of component may or may not include any other component (i.e., whether a specific type of component is considered complex or basic) is implementation dependent. That is, a specific type of component may be a basic component in one implementation and a complex component in another implementation; and vice versa.

Figure 1:
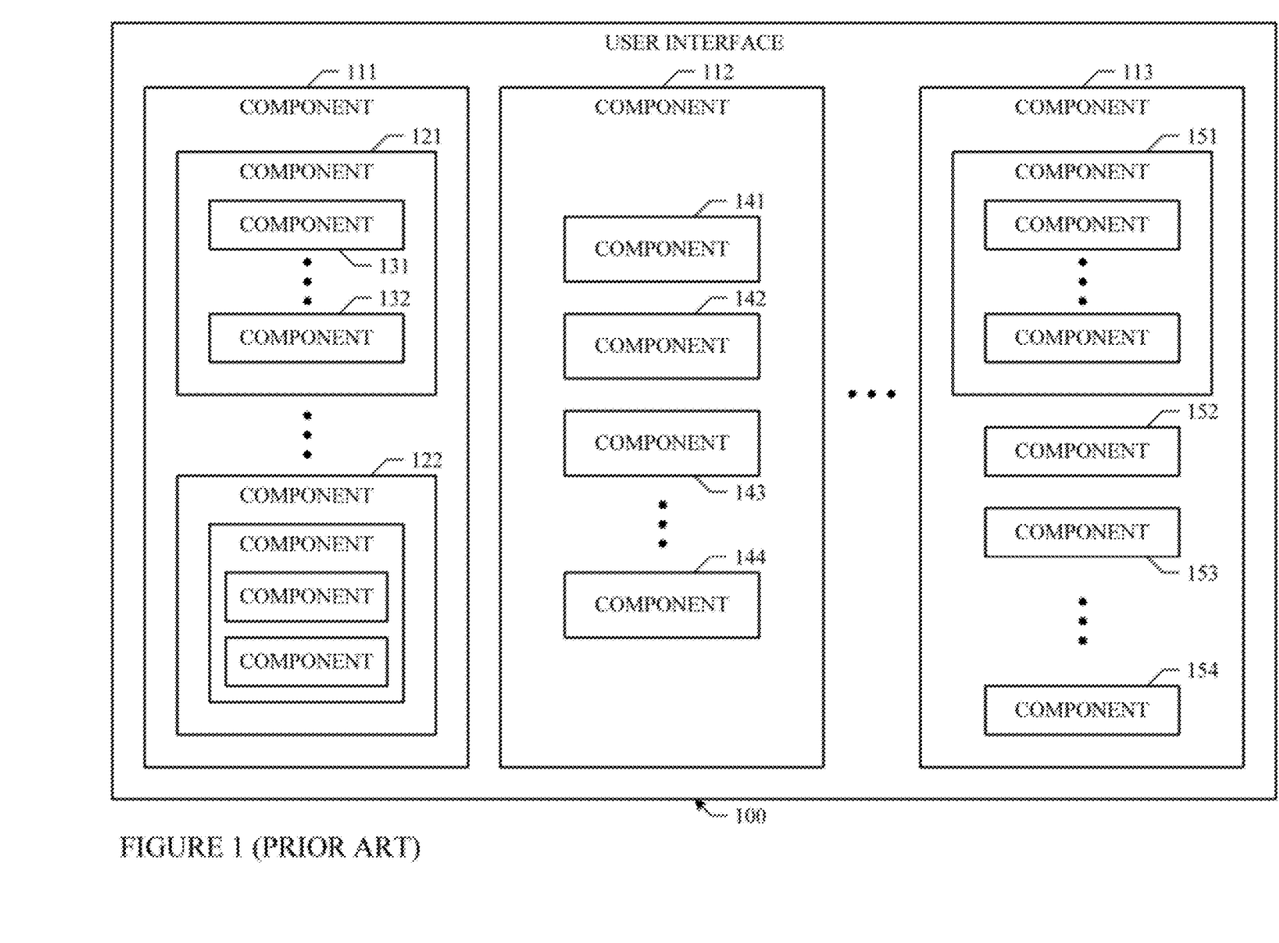
FIG. 1 (PRIOR ART) illustrates an example hierarchy of the components included in a graphical user interface.

The components used to implement or construct a GUI may be arranged in a hierarchy. FIG. 1 illustrates an example hierarchy of the components included in a GUI 100. Directly under GUI 100 are a number of complex components, including components 111, 112, 113. Within component 111 are a number of complex components, including components 121, 122. Within component 121 are a number of basic components, including components 131, 132. Note that components 131, 132 are basic components because they do not further include other components. Within component 112 are a number of basic components, including components 141, 142, 143, 144. Again, components 141, 142, 143, 144 are basic components because they do not further include other components. Within component 113 are a complex component 151 and a number of basic components, including components 152, 153, 154. As illustrated in FIG. 1, the hierarchy may have any number of levels.

There are many types of electronic devices in existence on which a native software application, with a GUI, may reside and be executed. Similarly, there are many types of electronic devices in existence that are capable of accessing a web-based software application. Some examples of such devices include, without limitation, desktop computers, notebook computers, netbook computers, tablet computers, smart phones, mobile phones, personal digital assistants (PDA), and so on. Each device may have specific hardware components, firmware, and operating system, and thus provide a specific platform or environment for software applications.

Figure 2A:
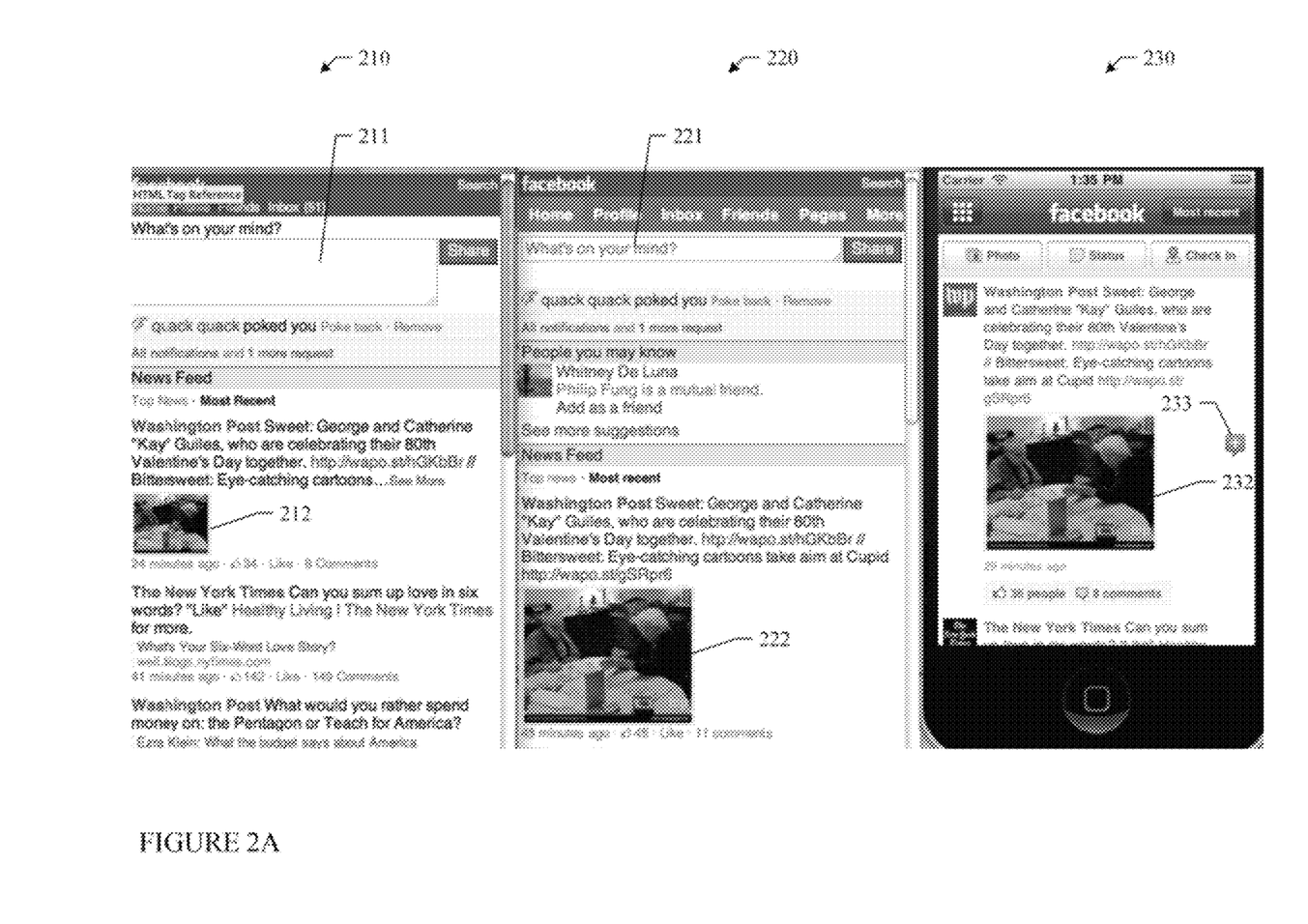
FIGS. 2A-2C illustrate comparisons of an example application user interface among three different electronic devices.
Figure 2B:
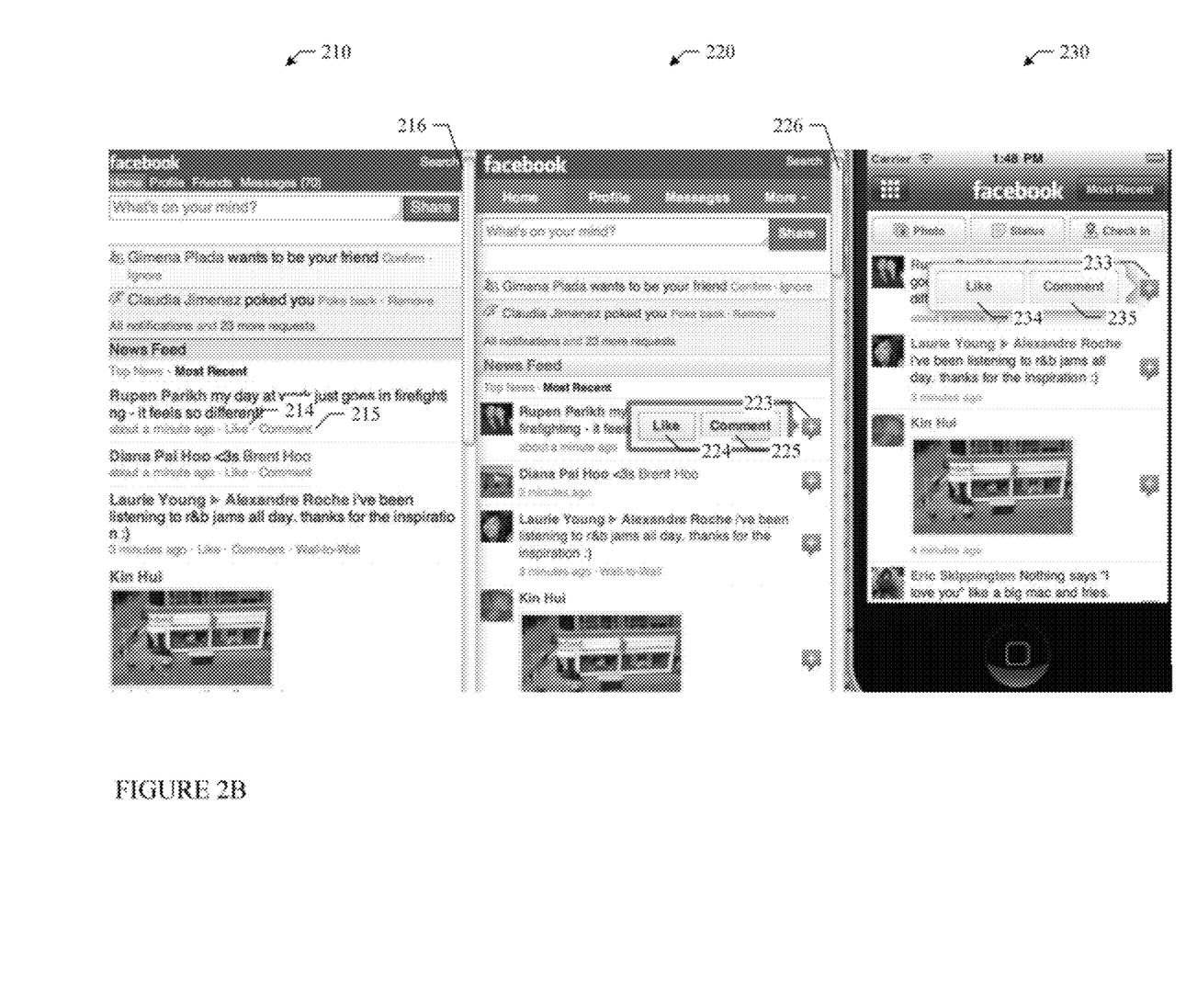
Figure 2C:
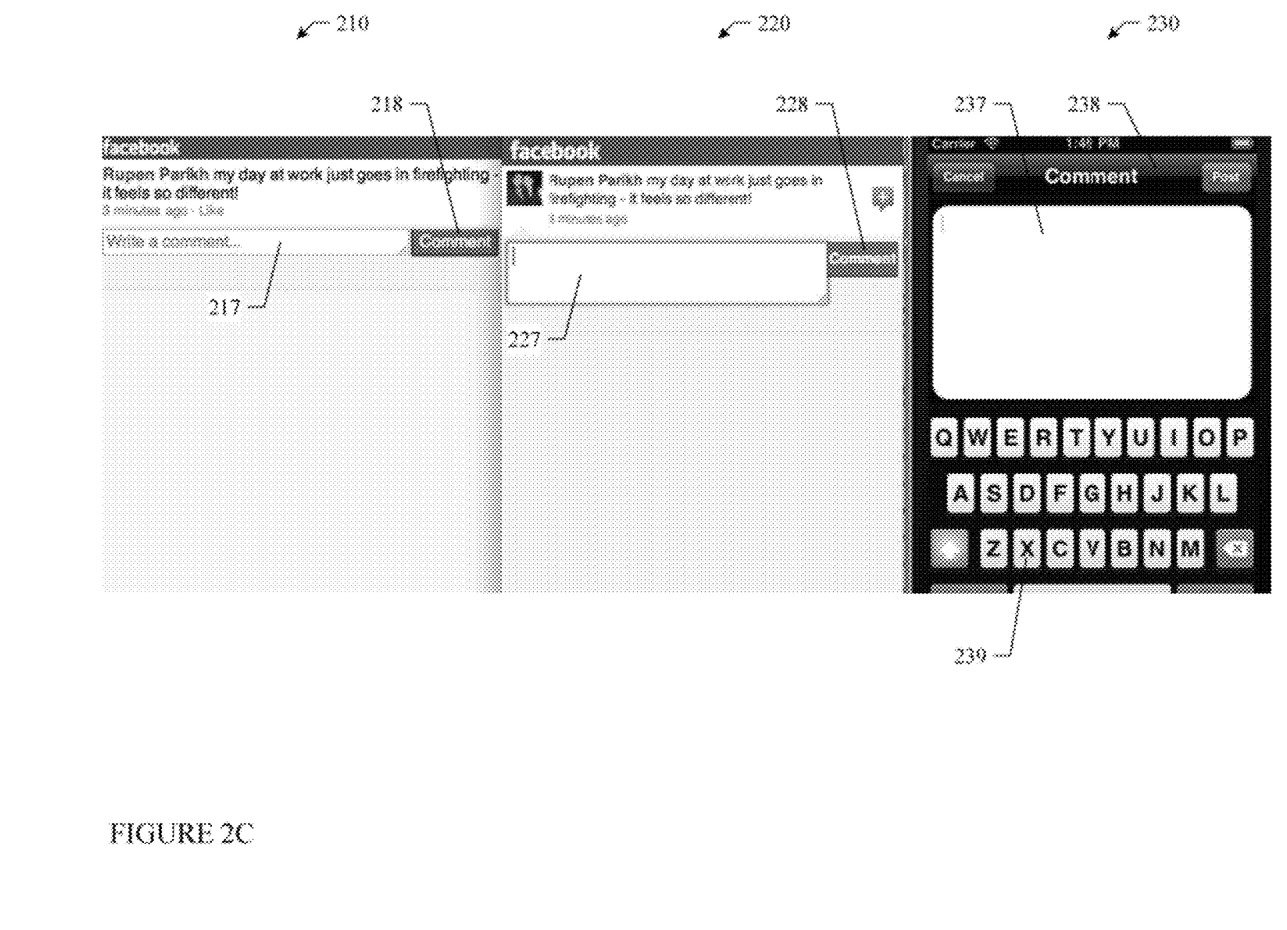

Sometimes, the GUI of an application as well as the individual UI components included in the GUI may have different visual appearances or behaviors depending on the specific electronic devices on which the application resides and is executed. FIGS. 2A-2C illustrate comparisons of an example application user interface among three different electronic devices 210, 220, 230. When the same screen from the application GUI is displayed on devices 210, 220, 230, it appears differently. For example, in FIG. 2A, a screen for displaying news feed, which includes a number of news stories, is displayed on devices 210, 220, 230. There is a text field 211 displayed on device 210 and a text field 221 displayed on device 220, but no such text field is displayed on device 230. Between devices 210, 220, text field 211 appears larger than text field 221. The first news story includes an image. Image 212 displayed on device 210 appears smaller than images 222, 232 displayed on devices 220, 230 respectively. There is an icon 233 displayed on device 230, but no such icon is displayed on devices 210, 220.

In FIG. 2B, the screen for displaying news feed is again displayed on devices 210, 220, 230. The user may indicate whether he likes a specific news story or comment on a specific news story. For device 210, a "like" icon 214 and a "comment" icon 215 are placed next to each news story. If the user of device 210 wants to indicate that he likes a specific news story or comment on a specific news story, he may click on the appropriate "like" icon 214 or "comment" icon 215. For devices 220, 230, there are no such icons placed next to each news story. Instead, there is a "plus" icon 223 displayed on device 220 and a similar "plus" icon 233 displayed on device 230. If the user of device 220 or device 230 wants to indicate that he likes a specific news story or comment on a specific news story, he may click "plus" icon 223 or "plus" icon 233. A small popup appears in response, which includes a "like" button and a "comment" button (e.g., "like" button 224 and "comment" button 225 on device 220, and "like" button 234 and "comment" button 235 on device 230). The user may then click on the appropriate "like" or "comment" button 224, 225, 234, 235. The popup and "like" button 224 and "comment" button 225 on device 220 appear differently (e.g., color, shape, and font) from the popup and "like" button 234 and "comment" button 235 on device 230. There is a scroll bar 216 displayed on device 210 and a scroll bar 226 displayed on device 220, but no such scroll bar is displayed on device 230.

In FIG. 2C, a screen for receiving text input is displayed on devices 210, 220, 230. There is a text input field 217 displayed on device 210, a text input field 227 displayed on device 220, and a text input field 237 displayed on device 230. However, text input fields 217, 227, 237 appear differently on devices 210, 220, 230 (e.g., color, size, layout). Similarly, there is a "comment" button 218 displayed on device 210, a "comment" button 228 displayed on device 220, and a "comment" button displayed on device 230. However, "comment" buttons 218, 228, 238 appear differently on devices 210, 220, 230 (e.g., color, font, size layout). There is a keypad 239 displayed on device 230, but no such keyboard is displayed on devices 210, 220.

Currently, for the same application to be executed on different devices providing different platforms, the application often needs to be "ported" for the individual devices or platforms first. When porting an application from one platform (e.g., a desktop computer with a LINUX-based operating system) to another platform (e.g., a smart phone with WINDOWS Mobile operating system), at least some of the code of the application, including code implementing the application's GUI, may need to be modified and possibly recompiled. This is especially the case when it is desirable to optimize the application for the individual devices (e.g., taking advantage of the hardware components or software libraries available on the specific devices). Thus, for a specific application to support multiple platforms and run on multiple devices, there need to be multiple versions of the code implementing the application, and possibly multiple executables compiled from the different versions of the code. This increases workload for software developers as they must implement and maintain multiple versions of the application for the different platforms and devices.

To address this problem, in particular embodiments, there is a single version of the code implementing a software application's GUI regardless of on how many different types of devices the application may be executed. During the actual execution of the application on a specific device, the GUI code dynamically determines the platform (e.g., the hardware configuration and the operating system of the specific device) on which the application is executed and supports a version of the GUI specifically suitable for that platform and the device.

Figure 3:
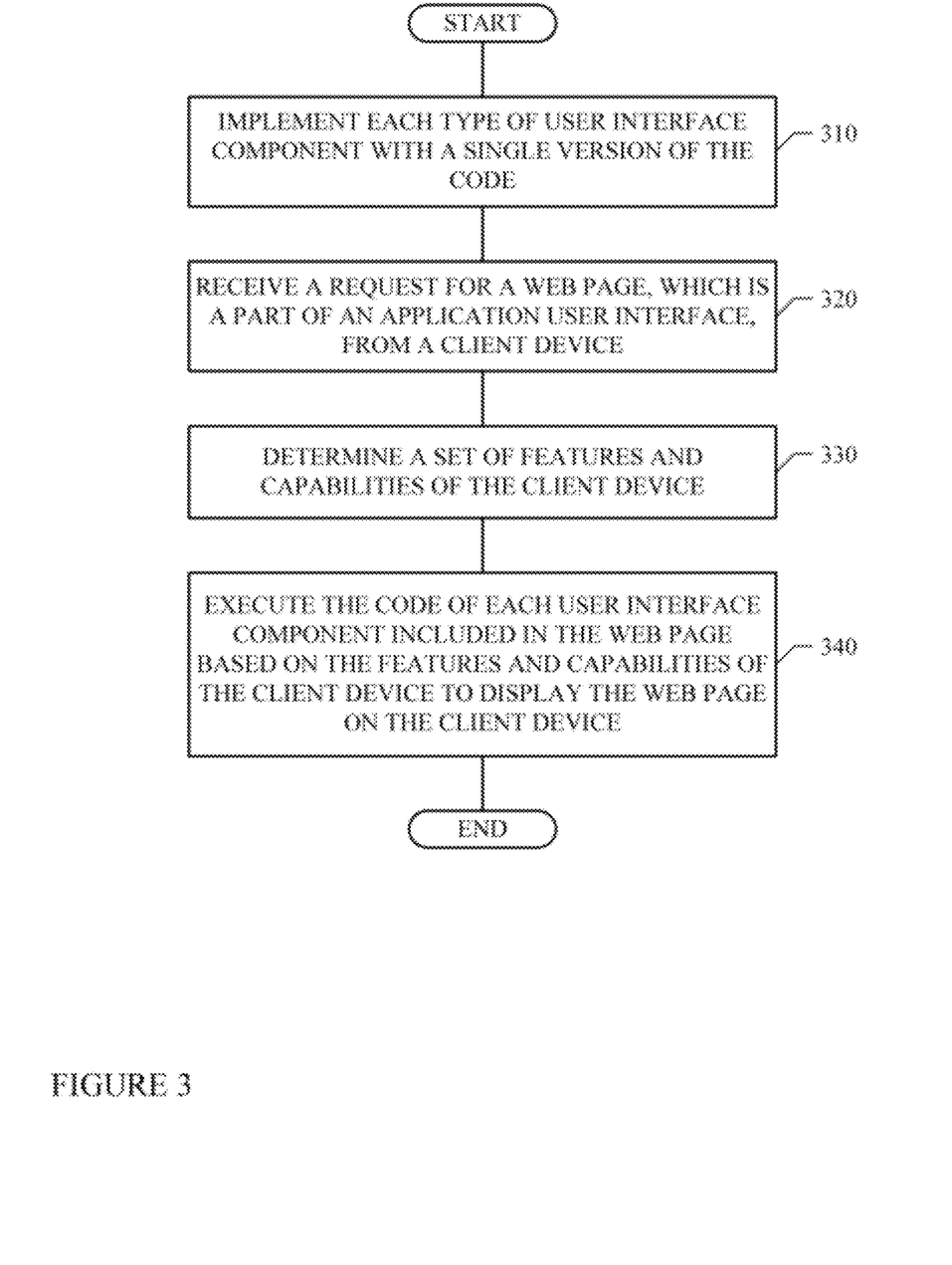
FIG. 3 illustrates a method for supporting multiple devices with a single version of the code implementing an application's user interface.

FIG. 3 illustrates a method for supporting multiple devices with a single version of the code implementing an application's user interface. The method may be similarly applied to a native application or a web-based application. As an example, the steps illustrated in FIG. 3 are described in connection with a web-based application. In a client-server environment, a web-based application may reside and be executed on a first computing device (e.g., a server) connected to a computer network (e.g., the Internet). The user interface of the web-based application may include any number of web pages, and each web page may include any number of UI components (e.g., buttons, links, icons, text blocks, text input fields, etc.) Any number of second computing devices (e.g., one or more clients), also connected to the computer network, may access the web-based application by communicating with the first computing device over the computer network using one or more suitable communications protocols (e.g., Hypertext Transfer Protocol, or HTTP). The web pages that implement the user interface of the web-based application may be displayed in the web browsers executing on the clients. The users may interact with the web-based application through one or more of these web pages. Usually, the web pages are dynamically generated for the client devices at the time they need to be displayed on the client devices.

Particular embodiments may implement each type of UI component or each UI component included in the user interface of a web-based application with a single version of the code, as illustrated in STEP 310. The UI components may be implemented using any suitable programming language, such as, for example and without limitation, Hypertext Preprocessor (PHP—a server-side HTML embedded scripting language), XHP (an extension to PHP that enables PHP to understand XML document fragments), JAVASCRIPT (a client-side scripting language implementing the ECMAScript language standard), Hypertext Markup Language (HTML), Cascading Style Sheets (CSS), etc. In particular embodiments, for each type of UI component, the code implementing the UI component takes into consideration the specific features and capabilities that may or may not be available on a specific client device.

In particular embodiments, specific types of UI components, whether complex or basic, may be defined for specific applications, depending on, for example, the requirements of the individual applications. For example, for an application that delivers news feed, one complex UI component may be a "composer" that enables a user to compose a news article or post. The "composer" UI component may include a number of buttons and a text input field. The button and text input field may each be a basic UI component. Another complex UI component may be a "news story" that displays a news article to the user. The "news story" UI component may include a text block, an image, a profile picture, and one or more icons. The text block, image, profile picture, and icon may each be a basic UI component.

In particular embodiments, for each type of basic UI component (i.e., a UI component that does not include any other UI component), the code implementing the basic UI component takes into consideration how the basic UI component should be rendered on a client device (e.g., its visual appearance, such as look and feel), the behavior of the basic UI component, and whether the basic UI component should be included in another complex UI component based on the features and capabilities of the client device. In particular embodiments, by incorporating various cases of programming logic into the code implementing the basic UI components, only a single version of the code implementing the application's GUI is needed. In other words, the programming logic of the GUI is moved into the code implementing the individual basic UI components included in the GUI. The code implementing the individual basic UI components takes into consideration the different types of devices on which the GUI may be executed and handles the different types of devices accordingly. As a result, there is no need for multiple versions of the code implementing the GUI.

Figure 4A:
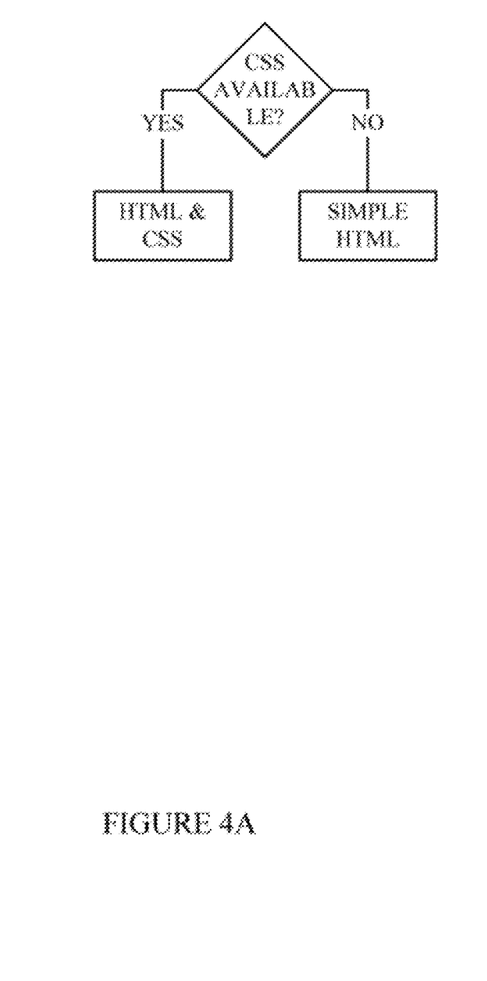
FIGS. 4A-4B illustrates examples of rendering logic for user interface components.

For example, a button is typically a basic UI component. When a button included in a web page is to be rendered on a client device, the HTML code for rendering the button is dynamically generated by the code (e.g., PHP code) implementing the button. When dynamically generating the HTML code for rendering the button on the client device, the PHP code may determine whether the client device supports CSS. If so, the PHP code generates HTML code with CSS. If not, the PHP code generates simple HTML code that does not requires CSS. The generated HTML code is then transmitted to the client device for rendering the button on the client device. FIG. 4A illustrates this example rendering logic for the button. The PHP code implementing a button thus takes into consideration both devices that support CSS and devices that do not support CSS and dynamically generates HTML code for rendering the button based on whether a specific device supports CSS.

Figure 4B:
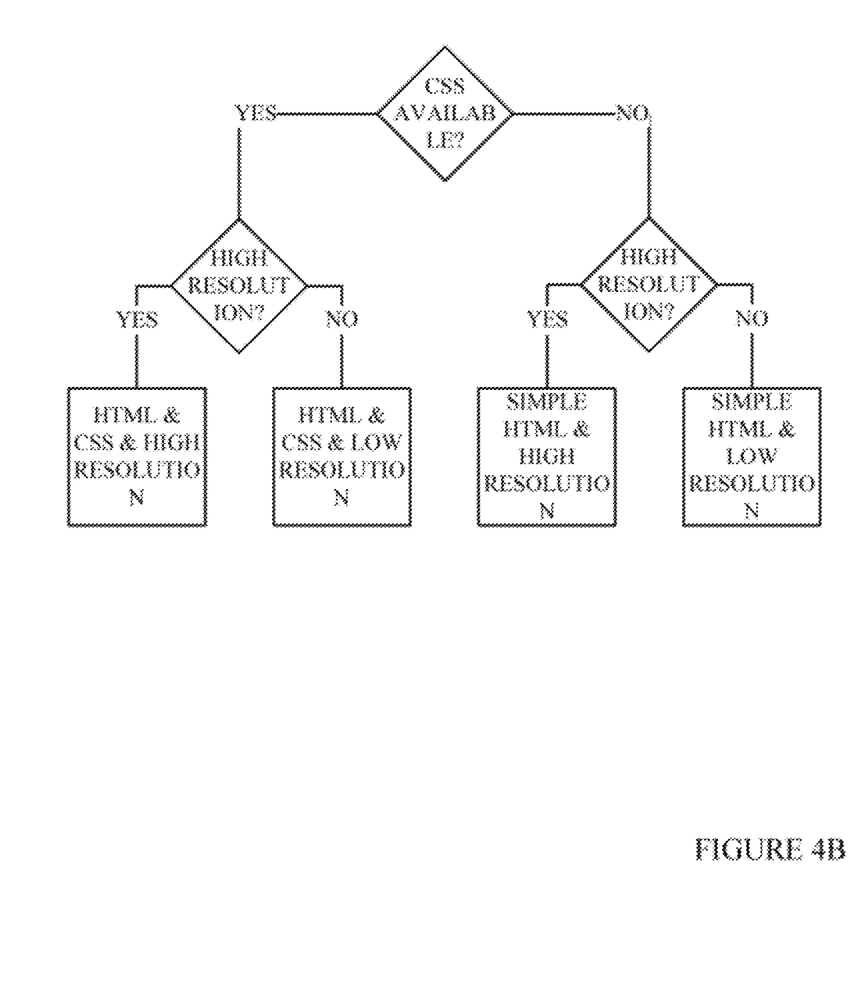

As another example, an image is another UI component. When an image included in a web page is to be displayed on a client device, the HTML code for displaying the image is again dynamically generated by the PHP code implementing the image. When dynamically generating the HTML code for displaying the image on the client device, the PHP code may determine: (1) whether the client device supports CSS; and (2) the resolution of the client device's display). In this case, there are four different possible combinations. If the device supports CSS and has a high resolution display, the PHP code may generate HTML code with CSS and high resolution version of the image. If the device supports CSS and has a low resolution display, the PHP code may generate HTML code with CSS and low resolution version of the image. If the device does not support CSS and has a high resolution display, the PHP code may generate simple HTML code and high resolution version of the image. If the device does not support CSS and has a low resolution display, the PHP code may generate simple HTML code and low resolution version of the image. FIG. 4B illustrates this example rendering logic for the image.

To generalize, in particular embodiments, for each type of basic UI component, the code (e.g., PHP code) implementing the basic UI component may include a series of conditional switches (i.e., conditional branding points). Each condition may correspond to a specific feature or capability that may or may not exist on specific client devices. If the condition is satisfied (e.g., if a client device supports a specific feature), then the code branches down one path. If the condition is not satisfied, (e.g., if a client device does not support the specific feature), then the code branches down another path. At the end of each path, the PHP code is able to determine a set of specific features supported by a device and dynamically generates HTML code for displaying the basic UI component on the device according to the set of features supported by the device. As a result, a single version of the code implementing each type of basic UI component is able to cover multiple types of devices having different features and capabilities.

When the web-based application is accessed by a user through a specific client device, particular embodiments may receive a request for a web page, which is a part of the application's user interface, from the client device, as illustrated in STEP 320. The web page may contain any number of basic UI components directly or indirectly. In particular embodiments, when a web page indirectly contains a basic UI component, the basic UI component may be contained in a complex UI component, which is then contained in the web page. In particular embodiments, the request for the web page may also identify the type of the client device making the request. There are different ways to identify the type of a specific device, and the present disclosure contemplates any suitable identification method. For example, a device may be identified by its unique device identifier or serial number, by its brand and model (e.g., BLACKBERRY CURVE, IPHONE 4), or by a predetermined keyword (e.g., "IPHONE", "BLACKBERRY", "desktop").

Based on the identifying information, particular embodiments may determine a set of features or capabilities supported by the client device, as illustrated in STEP 330. In particular embodiments, the set of features may include both hardware features (e.g., display resolution, keypad availability, touch screen availability, etc.) and software features (e.g., operating system, web browser version, software library availability, etc.). The features may be determined at any level of granularity. Particular embodiments may take advantage of the functionalities provided by Wireless Universal Resource FiLe (WURFL) when determining the specific features or capabilities of a device. WURFL is an open source software that provides an Extensible Markup Language (XML) configuration file, which contains information about device capabilities and features for a variety of mobile devices. For example, for IPHONE, the information provided by WURFL may include "MOZILLA/5.0 (IPHONE; U; CPU like MAC OS X; en) AppleWebKit/420+ (KHTML, like Gecko) Version/3.0".

Particular embodiments may execute the code implementing each basic UI component contained in the web page based on the set of features or capabilities supported by the client device, as illustrated in STEP 340. In particular embodiments, for each basic UI component, the code implementing the basic UI component may determine: (1) whether the basic UI component should be included in the web page, directly or indirectly; (2) if the basic UI component is to be included in the web page, how it should be rendered (e.g., generating the suitable HTML code for rendering the basic UI component on the client device); and (3) if the basic UI component is to be included in the web page, how it should behavior (e.g., generating the client-side code for handling user interactions with the basic UI component).

For example, a keypad may be a basic UI component (e.g., keypad 239 illustrated in FIG. 2C). The UI components may be rendered differently depending on whether a device has a hardware keypad (e.g., a BLACKBERRY phone). If the device does not have a hardware keypad and a software keypad needs to be rendered (e.g., an IPHONE), some UI components may need to be moved to other positions (i.e., rendered differently) to make room for the rendering of the software keypad.

As another example, if a device already has a hardware keypad (e.g., a BLACKBERRY phone), then there is no need to include a software-implemented keypad in the web page, since the user may use the hardware keypad for input. On the other hand, if the device does not have a hardware keypad (e.g., an IPHONE), then it may be necessary to include a software-implemented keypad in the web page when the user needs to input text. In this case, the code implementing the web page (i.e., a complex UI component) may specify that a keypad is included in the web page. However, the code implementing the keypad itself may decide whether the keypad should be rendered and displayed for each client device when the web page including the keypad is requested by the client device. Thus, depending on whether the client device has a hardware keypad, a keypad may or may not be included in the web page. Particular embodiments thus determine whether a specific basic UI component should be included in the web page based on the features available on the requesting client device (e.g., whether the basic UI component is really needed).

An image may be another basic UI component (e.g., images 212, 222, 232 illustrated in FIG. 2A). If a device has a larger display (e.g., a higher resolution display, such as an IPHONE), then a larger image may be rendered on the device. On the other hand, if the device has a smaller display (e.g., a lower resolution display, such as a low-end mobile phone), then a smaller image may be rendered on the device. Particular embodiments thus determine how best to render and display a specific basic UI component based on the features available on the requesting client device, and if necessary, generate client-side code for rendering and displaying the basic UI component that is specifically suitable to the requesting client device.

A clickable icon may also be a basic UI component (e.g., icons 224, 234 illustrated in FIG. 2B). If an icon is clicked by a user, it may behave differently depending on the specific device on which it is displayed. For example, in FIG. 2B, with device 220, when a user clicks on "like" icon 224, "like" icon 224 may switch to a different, "unlike" icon. However, with device 230, when a user clicks on "like" icon 234, which is similar to "like" icon 224, "like" icon 234 may remain unchanged. Particular embodiments thus determine how a specific basic UI component should behave in response to each user interaction with the basic UI component based on the features available on the requesting client device, and if necessary, generate client-side code for responding to each user interaction with the basic UI component that is specifically suitable to the requesting client device.

There may be many different configurations, in terms of both hardware and software, for electronic devices. FIGS. 2A-2C only illustrate a few examples. As another example, there may be two devices, one supporting JavaScript and the other not. When displaying a "like" icon on the two devices, the "like" icon may look the same on the two devices (i.e., have the same appearance). However, for the device that supports JavaScript, the action of "liking" may be asynchronous, not requiring a whole page refresh. In contrast, for the device that does not support JAVASCRIPT, the action of "liking" may be synchronous, requiring a whole page refresh, and thus is slower. The code implementing the basic UI component described above enables the two types of behaviors (i.e., asynchronous and synchronous) work from the same component and code base.

To generalize, in particular embodiments, for each type of basic UI component included, directly or indirectly, in a web page requested by a client device, the code implementing the basic UI component determines whether to include the basic UI component in the web page, how the basic UI component should be rendered on the client device, and how the basic UI component should behave when interacting with the user of the client device depending on the specific features or capabilities, including both hardware and software features, available on the client device. In particular embodiments, the code implementing the basic UI component may dynamically generate client-side code supporting the basic UI component that is specifically suitable for the client device based on the specific features or capabilities available on the client device. The dynamically generated client-side code may be transmitted to the client device for execution (e.g., to be executed in a web browser residing on the client device).

In particular embodiments, the web-based application described in connection with FIG. 3 may be a social-networking system implemented as a social-networking website. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc.

Figure 5:
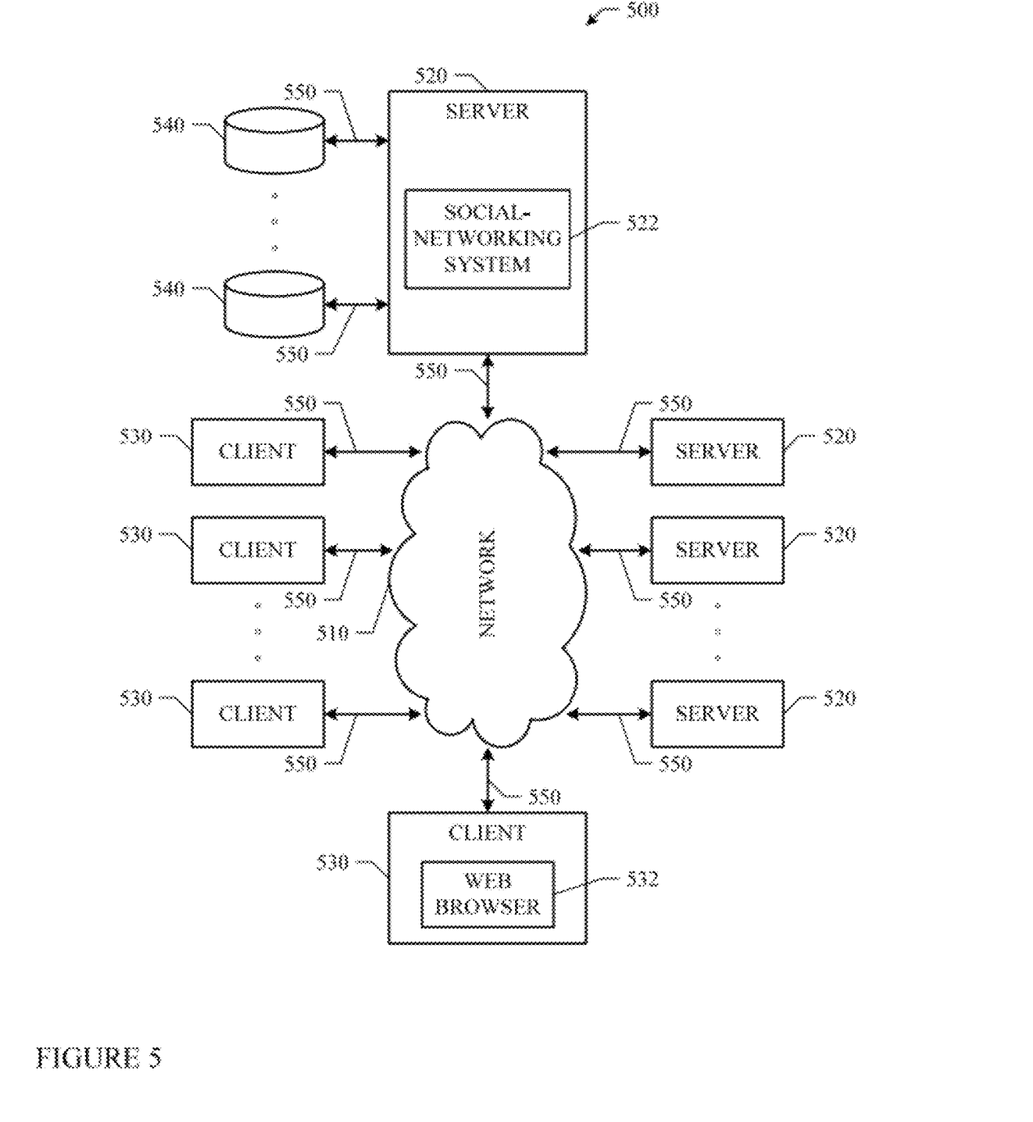
FIG. 5 illustrates an example network environment.

Particular embodiments may be implemented in a network environment. FIG. 5 illustrates an example network environment 500. Network environment 500 includes a network 510 coupling one or more servers 520 and one or more clients 530 to each other. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. This disclosure contemplates any suitable network 510.

One or more links 550 couple a server 520 or a client 530 to network 510. In particular embodiments, one or more links 550 each includes one or more wireline, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. This disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores. In particular embodiments, a social-networking system 522, implementing a social-networking website, may be hosted on one or more servers 520.

In particular embodiments, one or more data storages 540 may be communicatively linked to one or more severs 520 via one or more links 550. In particular embodiments, data storages 540 may be used to store various types of information. In particular embodiments, the information stored in data storages 540 may be organized according to specific data structures. In particular embodiments, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functionalities implemented or supported by client 530. For example and without limitation, a client 530 may be a desktop computer system, a notebook computer system, a netbook computer system, a handheld electronic device, or a mobile telephone. This disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
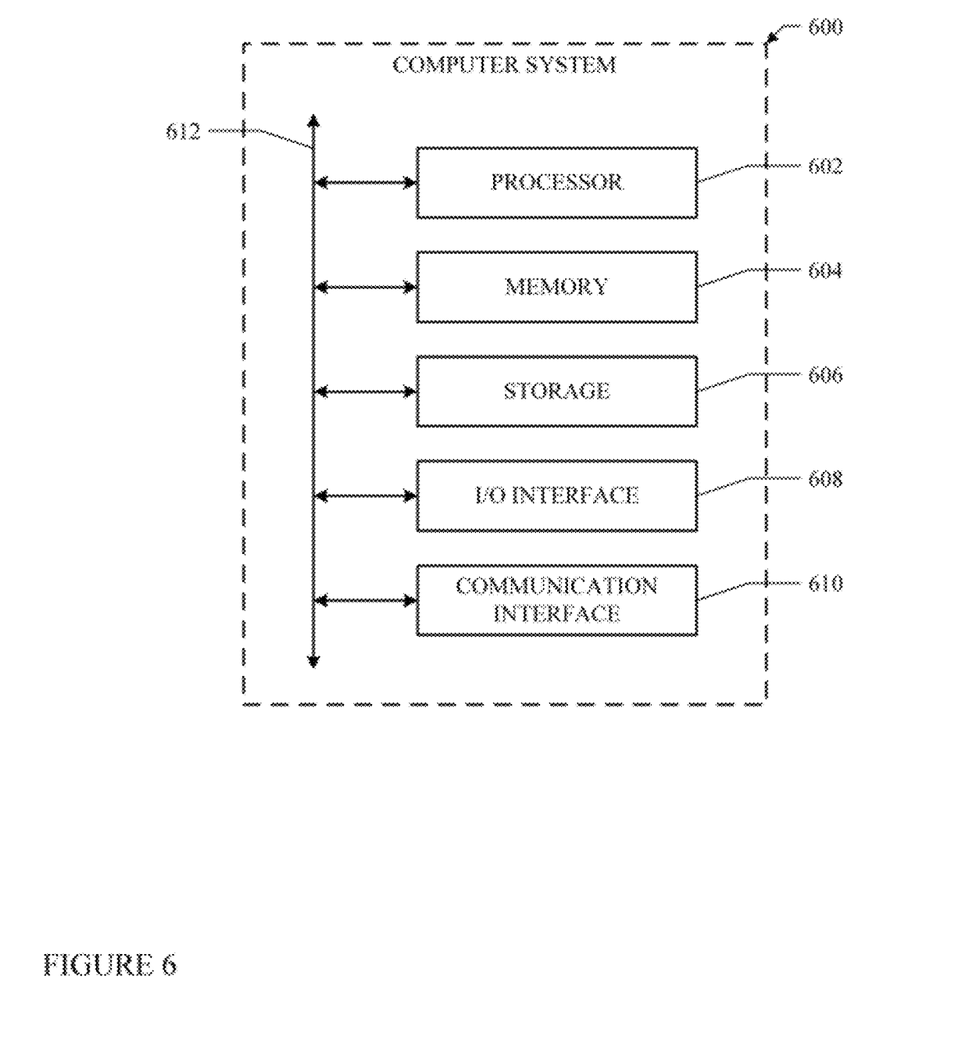
FIG. 6 illustrates an example computer system.

Particular embodiments may be implemented on one or more computer systems. FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving, by a first computer server, feature information that includes a plurality of feature sets associated with a respective plurality of device identifications, wherein each feature set of the plurality of feature sets includes a set of hardware features and software features for a respective device identification of the plurality of device identifications, wherein the first computer server receives the feature information from a second computer server that is different from the first computer server;
   storing, by the first computer server, the feature information in one or more data storages;

storing, by the first computer server, a first code associated with a first basic user interface (UI) component, the first basic UI component being configured to not include any other UI component, the first basic UI component being configured to receive user input, and the first code being configured to generate instances of the first basic UI component based on the plurality of feature sets;

storing, by the first computer server, a second code associated with a complex UI component, the complex UI component being configured to include one or more basic UI components and the second code being configured to generate instances of the complex UI component based on the plurality of feature sets;

receiving, by a web server executed by the first computer server and from a wide area network, a first request for a first UI from a first client device, wherein the first request includes a first device identification associated with the first client device;

receiving, by the web server executed by the first computer server and from the wide area network, a second request for a second UI from a second client device, wherein the second request includes a second device identification associated with the second client device, wherein the second device is different from the first device and the second device identification is different from the first device identification;

determining, by the first computer server, a first set of features from the plurality of feature sets, wherein the first set of features is retrieved, using the first device identification, from the feature information stored in the one or more data storages;

determining, by the first computer server, a second set of features from the plurality of feature sets, wherein the second set of features is retrieved, using the second device identification, from the feature information stored in the one or more data storages, wherein the second set of features is different from the first set of features;

generating, by the first computer server, code for rendering and displaying the first UI on the first client device, including a first instance of the complex UI component, generated using the second code, that includes a first instance of the first basic UI component generated using the first code and the first set of features, wherein the first instance of the first basic UI component determines that the first client device includes a hardware mechanism to receive user input associated with the first basic UI component and does not render the first basic UI component for display by the first instance of the complex UI component;

generating, by the first computer server, code for rendering and displaying the second UI on the second client device, including a second instance of the complex UI component, generated using the second code, that includes a second instance of the first basic UI component generated using the first code and the second set of features, wherein the second instance of the first basic UI component determines that the second client device does not include the hardware mechanism to receive user input associated with the first basic UI component and renders the second instance of the first basic UI component for display by the second instance of the complex UI component, wherein the second instance of the first basic UI component is different from the first instance of the first basic UI component;

sending, by the web server executed by the first computer server and to the wide area network, the code for rendering and displaying the first UI to the first client device; and sending, by the web server executed by the first computer server and to the wide area network, the code for rendering and displaying the second UI to the second client device.

2. The method of claim 1, wherein the code for rendering and displaying the first UI further includes code for responding to one or more user interactions with the first basic UI component performed on the first client device based on the first set of features.

3. The method of claim 1, wherein:
the first identification includes an identifier of the first client device or a phrase describing the first client device; and
the determining, by the first computer server, the first set of features of the plurality of feature sets, wherein the first set of features is retrieved, using the first device identification, from the feature information stored in the one or more data storages includes using the identifier of or the phrase describing the first client device.

4. A system comprising:
one or more processors; and
a memory coupled to the one or more processors and comprising instructions executable by the one or more processors, which when executed by the one or more processors, cause the system to:
receive feature information that includes a plurality of feature sets associated with a respective plurality of device identifications, wherein each feature set of the plurality of feature sets includes a set of hardware features and software features for a respective device identification of the plurality of device identifications, wherein the system receives the feature information from a computer server that is different from the system;
store the feature information in one or more data storages;
store a first code associated with a first basic user interface (UI) component, the first basic UI component being configured to not include any other UI component, the first basic UI component being configured to receive user input, and the first code being configured to generate instances of the first basic UI component based on the plurality of feature sets;
store a second code associated with a complex UI component, the second code being configured to generate instances of the complex UI component based on the plurality of feature sets;
receive, from a wide area network, a first request for a first UI from a first client device, wherein the first request includes a first device identification associated with the first client device;
receive, from the wide area network, a second request for a second UI from a second client device, wherein the second request includes a second device identification associated with the second client device, wherein the second device is different from the first device and the second device identification is different from the first device identification;
determine a first set of features from the plurality of feature sets, wherein the first set of features is retrieved, using the first device identification, from the feature information stored in the one or more data storages;

determine a second set of features of the plurality from feature sets, wherein the second set of features is retrieved, using the second device identification, from the feature information stored in the one or more data storages, wherein the second set of features is different from the first set of features of the first client device;

generate code for rendering and displaying the first UI on the first client device, including a first instance of the complex UI component, generated using the second code, that includes a first instance of the first basic UI component generated using the first code and the first set of features, wherein the first instance of the first basic UI component determines that the first client device includes a hardware mechanism to receive user input associated with the first basic UI component and does not render the first basic UI component for display by the first instance of the complex UI component;

generate code for rendering and displaying the second UI on the second client device, including a second instance of the complex UI component, generated using the second code, that includes a second instance of the first basic UI component generated using the first code and the second set of features, wherein the second instance of the first basic UI component determines that the second client device does not include the hardware mechanism to receive user input associated with the first basic UI component and renders the second instance of the first basic UI component for display by the second instance of the complex UI component, wherein the second instance of the first basic UI component is different from the first instance of the first basic UI component;

send, to the wide area network, the code for rendering and displaying the first UI to the first client device; and send, to the wide area network, the code for rendering and displaying the second UI to the second client device.

5. The system of claim 4, wherein the code for rendering and displaying the first UI further includes code for responding to one or more user interactions with the first basic UI component performed on the first client device based on the first set of features.

6. The system of claim 4, wherein:

the first identification includes an identifier of the first client device or a phrase describing the first client device; and to determine the first set of features of the plurality of feature sets, wherein the first set of features is retrieved, using the first device identification, from the feature information stored in the one or more data storages, the memory further includes instructions, which when executed by the one or more processors, further cause the system to use the identifier of or the phrase describing the first client device.

7. One or more computer-readable non-transitory storage media embodying software operable when executed by a first computer server to:

receive feature information that includes a plurality of feature sets associated with a respective plurality of device identifications, wherein each feature set of the plurality of feature sets includes a set of hardware features and software features for a respective device identification of the plurality of device identifications, wherein the first computer server receives the feature information from a second computer server that is different from the first computer server;

store the feature information in one or more data storages;

store a first code associated with a first basic user interface (UI) component, the first basic UI component being configured to not include any other UI component, the first basic UI component being configured to receive user input, and the first code being configured to generate instances of the first basic UI component based on the plurality of feature sets;

store a second code associated with a complex UI component, the second code being configured to generate instances of the complex UI component based on the plurality of feature sets;

receive, from a wide area network, a first request for a first UI from a first client device, wherein the first request includes a first device identification associated with the first client device;

receive, from the wide area network, a second request for a second UI from a second client device, wherein the second request includes a second device identification associated with the second client device, wherein the second device is different from the first device and the second device identification is different from the first device identification;

determine a first set of features from the plurality of feature sets, wherein the first set of features is retrieved, using the first device identification, from the feature information stored in the one or more data storages;

determine a second set of features from the plurality of feature sets, wherein the second set of features is retrieved, using the second device identification, from the feature information stored in the one or more data storages, wherein the second set of features is different from the first set of features of the first client device;

generate code for rendering and displaying the first UI on the first client device, including a first instance of the complex UI component, generated using the second code, that includes a first instance of the first basic UI component generated using the first code and the first set of features, wherein the first instance of the first basic UI component determines that the first client device includes a hardware mechanism to receive user input associated with the first basic UI component and does not render the first basic UI component for display by the first instance of the complex UI component;

generate code for rendering and displaying the second UI on the second client device, including a second instance of the complex UI component, generated using the second code, that includes a second instance of the first basic UI component generated using the first code and the second set of features, wherein the second instance of the first basic UI component determines that the second client device does not include the hardware mechanism to receive user input associated with the first basic UI component and renders the second instance of the first basic UI component for display by the second instance of the complex UI component, wherein the second instance of the first basic UI component is different from the first instance of the first basic UI component;

send, to the wide area network, the code for rendering and displaying the first UI to the first client device; and send, to the wide area network, the code for rendering and displaying the second UI to the second client device.

8. The one or more media of claim 7, wherein the code for rendering and displaying the first UI further includes code for responding to one or more user interactions with the first basic UI component performed on the first client device based on the first set of features.

9. The one or more media of claim 7, wherein:
the first identification includes an identifier of the first client device or a phrase describing the first client device; and
to determine a first set of features of the plurality of feature sets, wherein the first set of features is retrieved, using the first device identification, from the feature information stored in the one or more data storages, the software operable when executed by a first computer server to use the identifier of or the phrase describing the first client device.

10. The method of claim 1,
wherein the determining, by the computer server, the first set of features from the plurality of feature sets based on the first device identification includes accessing an Extensible Markup Language (XML) configuration file that includes the feature information to determine the first set of features from the plurality of feature sets based on the first device identification; and
wherein the determining, by the computer server, the second set of features from the plurality of feature sets based on the second device identification includes accessing the XML configuration file that includes the feature information to determine the second set of features from the plurality of feature sets based on the second device identification.

11. The method of claim 1, further comprising:
generating a high resolution version of an image based on the first set of features; and
generating a low resolution version of the image based on the second set of features.

12. The method of claim 1, wherein the hardware mechanism includes a hardware button.

13. The method of claim 12, wherein:
the hardware mechanism includes a hardware keypad that includes a plurality of hardware buttons that includes the hardware button; and
the second instance of the first basic UI component includes a keyboard for display by the second instance of the complex UI component.

14. The method of claim 12, wherein the second instance of the first basic UI component includes a button for display by the second instance of the complex UI component.

* * * * *